United States Patent
Phillips et al.

(10) Patent No.: US 8,676,161 B2
(45) Date of Patent: Mar. 18, 2014

(54) ENFORCING TIME-OUT PERIODS IN PAYMENT-ENABLED MOBILE DEVICE

(75) Inventors: Simon Phillips, York (GB); Jonathan Main, Hampshire (GB); Ronald D. Carter, Cambs (GB); David A. Roberts, Warrington (GB)

(73) Assignee: MasterCard International Incorporated, Purchase, NY (US)

( * ) Notice: Subject to any disclaimer, the term of this patent is extended or adjusted under 35 U.S.C. 154(b) by 290 days.

(21) Appl. No.: 12/886,845

(22) Filed: Sep. 21, 2010

(65) Prior Publication Data

US 2012/0021722 A1  Jan. 26, 2012

Related U.S. Application Data

(60) Provisional application No. 61/365,855, filed on Jul. 20, 2010.

(51) Int. Cl.
*H04M 1/66* (2006.01)

(52) U.S. Cl.
USPC ............. 455/411; 455/410; 705/64; 705/72; 705/75; 705/35; 902/1; 902/2; 902/4; 902/5; 902/22

(58) Field of Classification Search
USPC ........... 455/410, 411, 575.1–90.3; 379/91.01, 379/114.19; 705/64–69, 72, 73, 75–79, 80, 705/26.81, 26.82, 35, 39, 44; 902/1, 2, 4, 5, 902/22, 25, 27, 28, 31, 32, 40, 41
See application file for complete search history.

(56) References Cited

U.S. PATENT DOCUMENTS

| | | | | |
|---|---|---|---|---|
| 6,002,737 A * | 12/1999 | Devanagundy et al. | ......... | 377/20 |
| 6,257,486 B1 * | 7/2001 | Teicher et al. | ................ | 235/380 |
| 6,845,367 B2 * | 1/2005 | Bendel et al. | ................... | 705/65 |
| 6,963,588 B1 * | 11/2005 | Lynch et al. | .................. | 370/516 |
| 7,051,332 B2 * | 5/2006 | Gatto et al. | ................... | 718/108 |
| 7,110,792 B2 | 9/2006 | Rosenberg | | |
| 7,610,215 B1 * | 10/2009 | Folk et al. | ....................... | 705/16 |
| 2001/0037249 A1 | 11/2001 | Fitzgerald et al. | | |
| 2002/0032874 A1 * | 3/2002 | Hagen | ........................... | 713/202 |
| 2006/0150254 A1 | 7/2006 | Siukonen | | |
| 2007/0266256 A1 | 11/2007 | Shah et al. | | |
| 2008/0114699 A1 * | 5/2008 | Yuan et al. | ...................... | 705/78 |
| 2008/0302876 A1 * | 12/2008 | Mullen | ......................... | 235/492 |
| 2008/0313731 A1 * | 12/2008 | Iftimie et al. | ................... | 726/18 |
| 2009/0068982 A1 * | 3/2009 | Chen et al. | ..................... | 455/407 |
| 2009/0094126 A1 * | 4/2009 | Killian et al. | .................. | 705/17 |
| 2009/0166408 A1 * | 7/2009 | Phillips | ......................... | 235/380 |
| 2010/0198728 A1 * | 8/2010 | Aabye et al. | .................... | 705/44 |

FOREIGN PATENT DOCUMENTS

WO  2008/041980 A2  4/2008

* cited by examiner

*Primary Examiner* — Ronald Eisner
(74) *Attorney, Agent, or Firm* — Buckley, Maschoff & Talwalkar LLC

(57) ABSTRACT

A mobile device includes a housing and an antenna mounted in or on the housing. The antenna is for transmitting and receiving transaction signals to and from a point of sale (POS) terminal. The device also includes at least one user interface element mounted on the housing and a transceiver mounted in the housing and coupled to the antenna. Still further, the device includes a secure element mounted in the housing. The secure element is coupled to the transceiver and stores a payment application program. The payment application program is for handling exchanging of the transaction signals with the POS terminal. A tick counter is operated within the secure element. The tick counter is for enforcing at least one time-out period with respect to transactions handled by the payment application program.

13 Claims, 6 Drawing Sheets

US 8,676,161 B2

1

ENFORCING TIME-OUT PERIODS IN PAYMENT-ENABLED MOBILE DEVICE

CROSS-REFERENCE TO RELATED APPLICATION

This application claims the benefit of U.S. provisional patent application Ser. No. 61/365,855, filed Jul. 20, 2010, which is incorporated herein by reference.

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale (POS) terminal. The reader reads the account number from the magnetic stripe. The account number is then used to route a transaction authorization request that is initiated by the POS terminal.

In pursuit of still greater convenience and more rapid transactions at POS terminals, payment cards have more recently been developed that allow the account number to be automatically read from the card by radio frequency communication between the card and a so-called "proximity reader" which may be incorporated with the POS terminal. In such cards, often referred to as "proximity payment cards" or "contactless payment cards", a radio frequency identification (RFID) integrated circuit (IC, often referred to as a "chip") is embedded in the card body. (The term 'RFID' should be understood to encompass ISO14443 communication or any other contactless communication technique used by proximity payment cards.) A suitable antenna is also embedded in the card body and is connected to the RFID chip to allow the chip to receive and transmit data by RF communication via the antenna. In typical arrangements, the RFID chip is powered from an interrogation signal that is transmitted by the proximity reader and received by the card antenna.

MasterCard International Incorporated, the assignee hereof, has established a widely-used standard, known as "PayPass", for interoperability of contactless payment cards and proximity readers.

It has been proposed that the capabilities of a contactless payment card be incorporated into a mobile telephone, thereby turning the mobile telephone into a contactless payment device. Typically a mobile telephone/contactless payment device (also referred to as a "payment-enabled mobile telephone") includes integrated circuitry with the same functionality as the RFID IC of a contactless payment card. In addition, the mobile telephone/contactless payment device includes a loop antenna that is coupled to the payment-related IC for use in sending and/or receiving messages in connection with a transaction that involves contactless payment.

As with all payment devices, it is desirable that certain security measures be taken to prevent unauthorized use of payment-enabled mobile telephones. For example, it may be required, at least for relatively high-value transactions, that the user enter a personal identification number (PIN) into the phone keypad before entering into a transaction using the payment-enabled mobile telephone. The present inventors have now recognized that is may be desirable to provide improved security in connection with procedures in the payment-enabled mobile telephone relating to PIN entry and

2 verification and/or relating to validity of other time sensitive data (e.g., acknowledgment (ACK) status, transaction context).

DETAILED DESCRIPTION

In general, and for the purpose of introducing concepts of embodiments of the present invention, the security of transactions involving a payment-enabled mobile telephone is enhanced by using a "tick counter" process to enforce a time-limit on the PIN verification status for the mobile telephone or on other time sensitive data. The tick counter may be incorporated in the same secure element that contains the payment application in the mobile telephone. A first tick value may be obtained by the payment application from the tick counter at a time when the PIN is verified prior to tapping the mobile telephone on the POS terminal. A second tick value may be obtained by the payment application from the tick counter when the interaction between the POS terminal and the payment application takes place. The payment application may compare the difference between the tick values with a time limit value to confirm that the interaction is not occurring after the time-out period on PIN verification is supposed to have ended.

Figure 1:
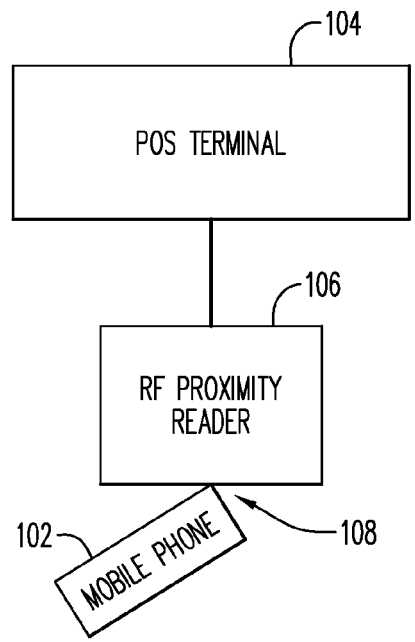
FIG. 1 schematically illustrates some physical aspects of a purchase transaction performed using a payment-enabled mobile telephone.

FIG. 1 schematically illustrates some physical aspects of a purchase transaction performed using a payment-enabled mobile telephone 102 provided in accordance with aspects of the present invention. This transaction may in general terms be performed in accordance with conventional proposals for transactions of the type described in an earlier portion of this disclosure. A conventional POS terminal is represented at block 104 in FIG. 1, and block 106 represents a conventional proximity reader interfaced to or incorporated in the POS terminal 104. To allow the payment-enabled mobile telephone 102 to upload the payment card account number to the POS terminal 104 and otherwise to communicate with the POS terminal 104, the user may tap the payment-enabled mobile telephone 102 on the proximity reader 106, as indicated at 108 in FIG. 1.

Figure 2:
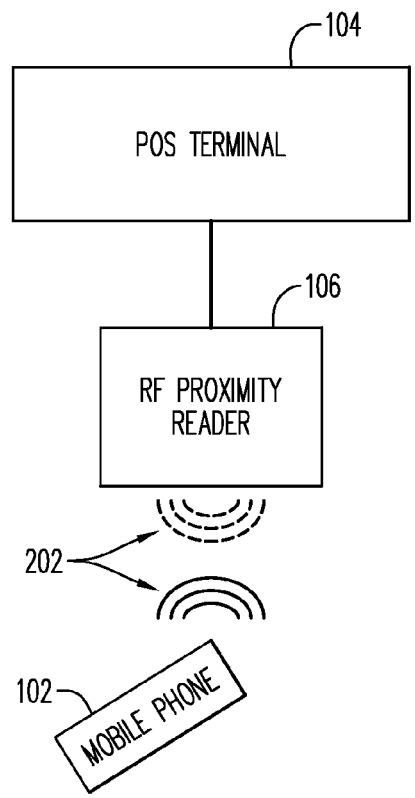
FIG. 2 schematically illustrates some communication aspects of the purchase transaction illustrated in FIG. 1.

FIG. 2 schematically illustrates some communication aspects of the purchase transaction illustrated in FIG. 1. As in FIG. 1, the POS terminal 104 and the proximity reader 106 are shown, as is the payment-enabled mobile telephone 102. Wireless communication between the payment-enabled mobile telephone 102 and the proximity reader 106 is indicated at 202. In some embodiments, for example, the communication may be carried out in accordance with the above-mentioned PayPass standard. Via the wireless communication 202, the payment-enabled mobile telephone 102 uploads the payment card account number to the POS terminal 104. The wireless communication 202 may also implement handshaking signals, device authentication, security procedures, etc. Certain examples of such security procedures as provided in accordance with the invention will be described below.

Figure 3:
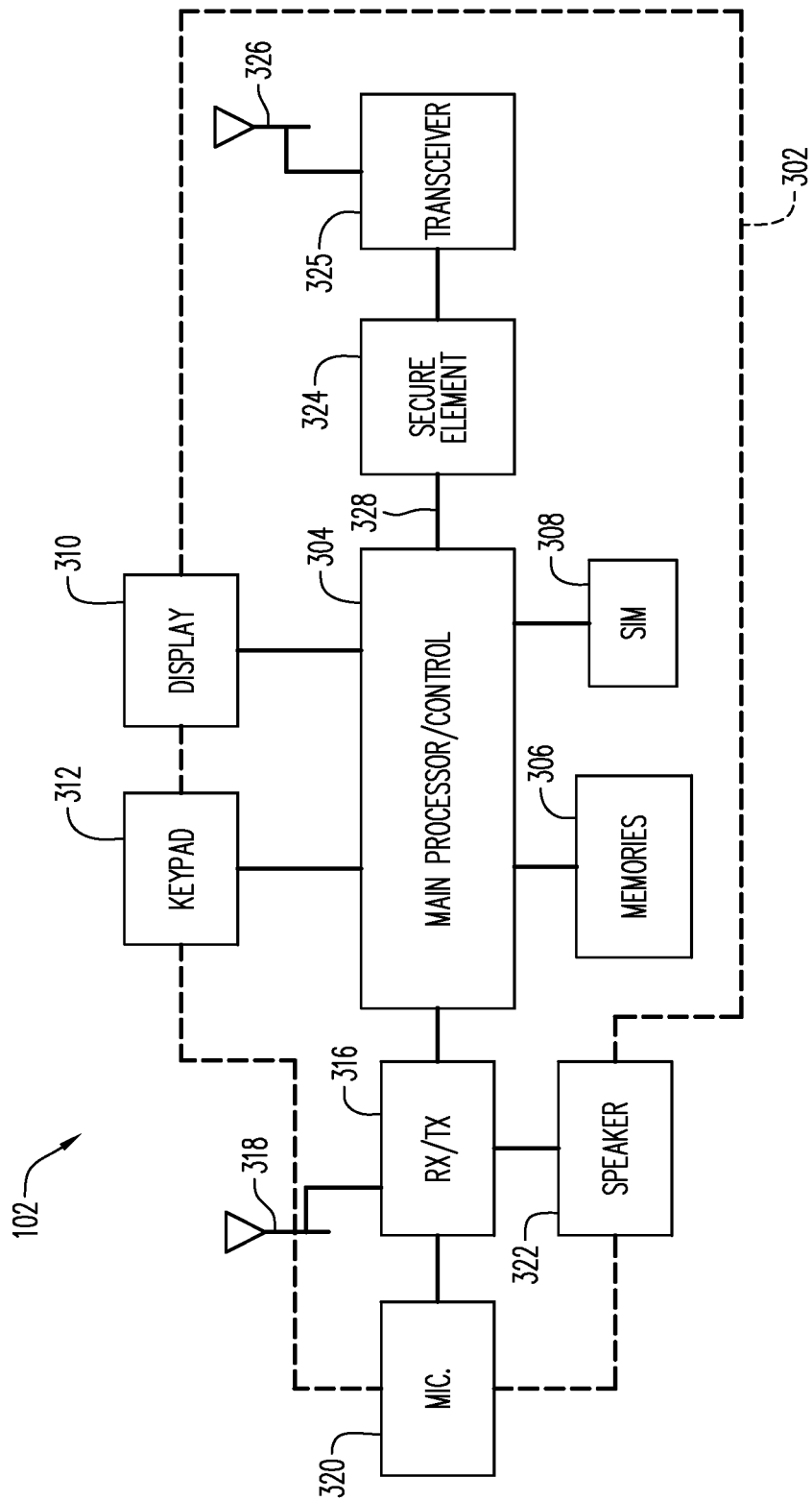
FIG. 3 is a block diagram representation of a payment-enabled mobile telephone in which the present invention may be implemented.

FIG. 3 is a schematic block diagram of an example embodiment of the payment-enabled mobile telephone 102. (FIG. 3 does not necessarily represent the physical layout of the payment-enabled mobile telephone 102.) In its hardware and in much of its software/firmware, the payment-enabled mobile telephone 102 may be substantially conventional. However, the payment-enabled mobile telephone 102 may include a secure element as described below and provided in accordance with the invention.

The payment-enabled mobile telephone 102 may include a conventional housing (indicated by dashed line 302 in FIG. 3) that contains and/or supports the other components of the payment-enabled mobile telephone 102. The housing may, for example, be shaped and sized so as to be held in the user's hand. The payment-enabled mobile telephone 102 further includes conventional control circuitry 304, for controlling over-all operation of the payment-enabled mobile telephone 102. (The control circuitry 304 may for example be similar to—or the same as—a conventional microprocessor, and accordingly may be referred to as a "processor".) Other components of the payment-enabled mobile telephone 102, which are in communication with and/or controlled by the control circuitry 304, include: (a) one or more memory devices 306 (e.g., program and working memory, etc.); (b) a SIM (subscriber identification module) card 308 (also referred to as a "universal integrated circuit card" or "UICC", which may store and run a SIM application, which is not separately shown); (c) a conventional keypad 310 for receiving user input; and (d) a conventional display 312 for displaying output information to the user. In some embodiments, both the keypad and the display may be implemented with a touch screen that displays a virtual keypad. Hence the term "keypad" should be understood to include a touch screen. The SIM card 308 may be conventional or alternatively may at least in part constitute a secure element as described below.

The payment-enabled mobile telephone 102 also includes conventional receive/transmit circuitry 316 that is also in communication with and/or controlled by the control circuitry 304. The receive/transmit circuitry 316 is coupled to an antenna 318 and provides the communication channel(s) by which the payment-enabled mobile telephone 102 communicates via the mobile network (not shown). The payment-enabled mobile telephone 102 further includes a conventional microphone 320, coupled to the receive/transmit circuitry 316. Of course, the microphone 320 is for receiving voice input from the user. In addition, a loudspeaker 322 is included to provide sound output to the user, and is coupled to the receive/transmit circuitry 316.

In conventional fashion, the receive/transmit circuitry 316 operates to transmit, via the antenna 318, voice signals generated by the microphone 320, and operates to reproduce, via the loudspeaker 322, voice signals received via the antenna 318. The receive/transmit circuitry 316 may also handle transmission and reception of text messages and/or other data communications via the antenna 318.

The payment-enabled mobile telephone 102 may also include a secure element 324. The secure element 324 may, in some embodiments (and although depicted as separate from SIM card 308), be incorporated in or integrated with SIM card 308, assuming that the SIM card 308 has conventional security features therein to deter or prevent tampering with or unauthorized access to the SIM card 308 and/or software/firmware/data stored in the SIM card 308. More generally, the secure element 324 has circuitry that is secured from tampering or unauthorized access and/or has other features, and/or has undergone testing and/or a certification process, to assure that it can resist attacks. As such, the secure element 324 may operate as a secure environment for executing programs such as a payment application program, as discussed below. In conjunction with the payment application program, the secure element 324 may store a payment card account number that identifies a payment card account that has been issued to the individual who owns the payment-enabled mobile telephone 102. Further, the payment-enabled mobile telephone 102 may include a loop antenna 326, and a transceiver circuit 325 coupled between the loop antenna 326 and the secure element 324. The transceiver circuit 325 may operate in a conventional manner to receive payment transaction signals from POS terminals via the loop antenna 326 and to transmit via the loop antenna 326 payment transaction signals generated by the payment application program. It will also be understood that the transceiver circuit 325 relays, to the payment application program, the transaction signals received via the loop antenna 326.

In some embodiments, the secure element may be coupled to the control circuitry 304, as indicated at 328.

The payment application may operate so as to interact with an RFID/NFC proximity reader (e.g., item 106 in FIGS. 1 and 2) of a POS terminal (e.g., item 104 in FIGS. 1 and 2) to provide the payment card account number (stored in the secure element 324) for a purchase transaction at the POS terminal. For example, the payment application may be configured to operate in accordance with the above-mentioned "PayPass" standard.

Figure 4:
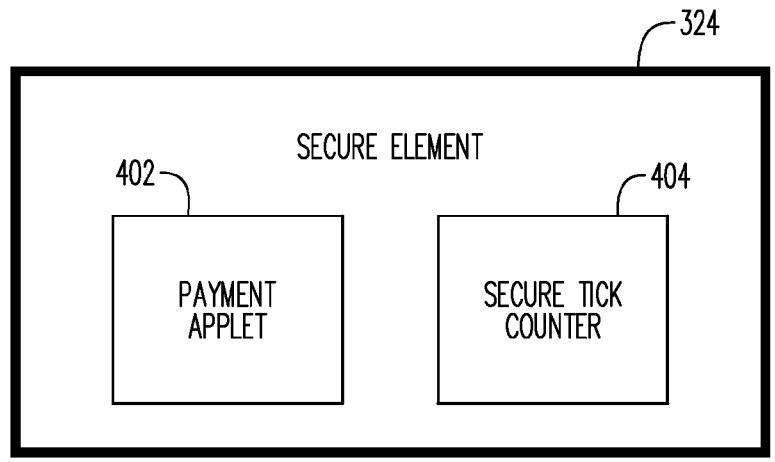
FIGS. 4 and 5 are block diagrams that illustrate security aspects of the mobile telephone hardware depicted in FIG. 3.
Figure 5:
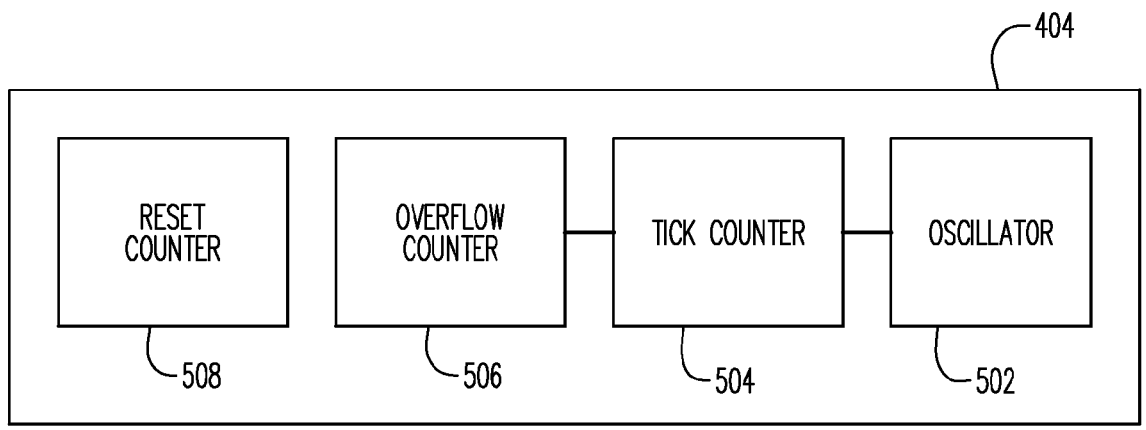

FIGS. 4 and 5 are block diagrams that illustrate details of the secure element 324. As seen from FIG. 4, a payment application program 402 is stored in and runs on the secure element 324. (The payment application program 402 may be a relatively small application program, and hence is sometimes referred to as an "applet".) The payment application program 402 may operate generally in accordance with conventional practices, but in addition may also implement security features described herein.

Continuing to refer to FIG. 4, a secure tick counter 404 is also implemented within the secure element 324. FIG. 5 shows details of the secure tick counter 404. As seen from FIG. 5, the secure tick counter 404 includes an oscillator 502, which may be implemented by suitable integrated circuit elements, or otherwise may be provided in accordance with known techniques. In addition, the secure tick counter 404 may include a counter element 504 that is coupled to the oscillator 502. The counter element 504 may increment in response to each cycle of the oscillator 502. The cycles of the oscillator 502 may be referred to as "ticks" and the function of the counter element 504 is to count the "ticks".

The secure tick counter 404 may also include an overflow counter 506 that is coupled to the counter element 504. The overflow counter 506 may function so as to increment each time the counter element 504 overflows.

Still further, the secure tick counter 404 may include a reset counter 508 that is accessible by the payment application program 402 and that is incremented upon each reset (e.g., power up) for the mobile telephone 102 and/or the secure element 324 and/or the payment application program 402 and/or the counter element 504.

For purposes of storing and running the payment application program 402, the secure element 324 may encompass both storage (memory) elements and processing circuitry coupled to the storage elements and operating under the control of the payment application program 402. The storage elements and the processing circuitry are not separately depicted apart from the secure element 324.

Figure 6:
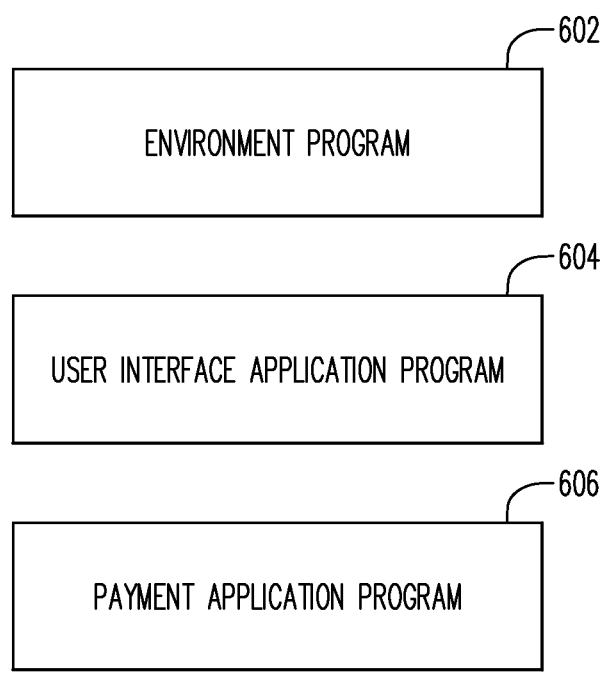
FIG. 6 schematically illustrates some of the software aspects of the payment-enabled mobile telephone of FIG. 3.

FIG. 6 schematically illustrates some of the software aspects of the payment-enabled mobile telephone 102 depicted in FIG. 3. The basic software architecture for the payment-enabled mobile telephone 102 may be conventional, and may include a program 402 (hereinafter referred to as the "environment program") which provides an environment for supporting application programs to run on the control circuitry 304. For example, the environment program 602 may be a conventional mobile operating system or kernel. In some embodiments, the environment program 602 may be implemented as a Java virtual machine which operates on top of a conventional operating system (OS) for a mobile telephone.

A user interface application program 604 also is stored in and runs in the payment-enabled mobile telephone 102. The user interface application program 604 may be implemented as a so-called "MIDlet" in accordance with a Java mobile information device profile (MIDP). The user interface application program 604 may be generally conventional in its operation. The environment program 602, too, may be conventional.

The payment-enabled mobile telephone 102 also stores and runs the above-mentioned payment application program 402 as discussed above in connection with the secure element 324. Some details of the payment application program 402 will be described below in conjunction with the flow charts which appear in the drawings.

Figure 7:
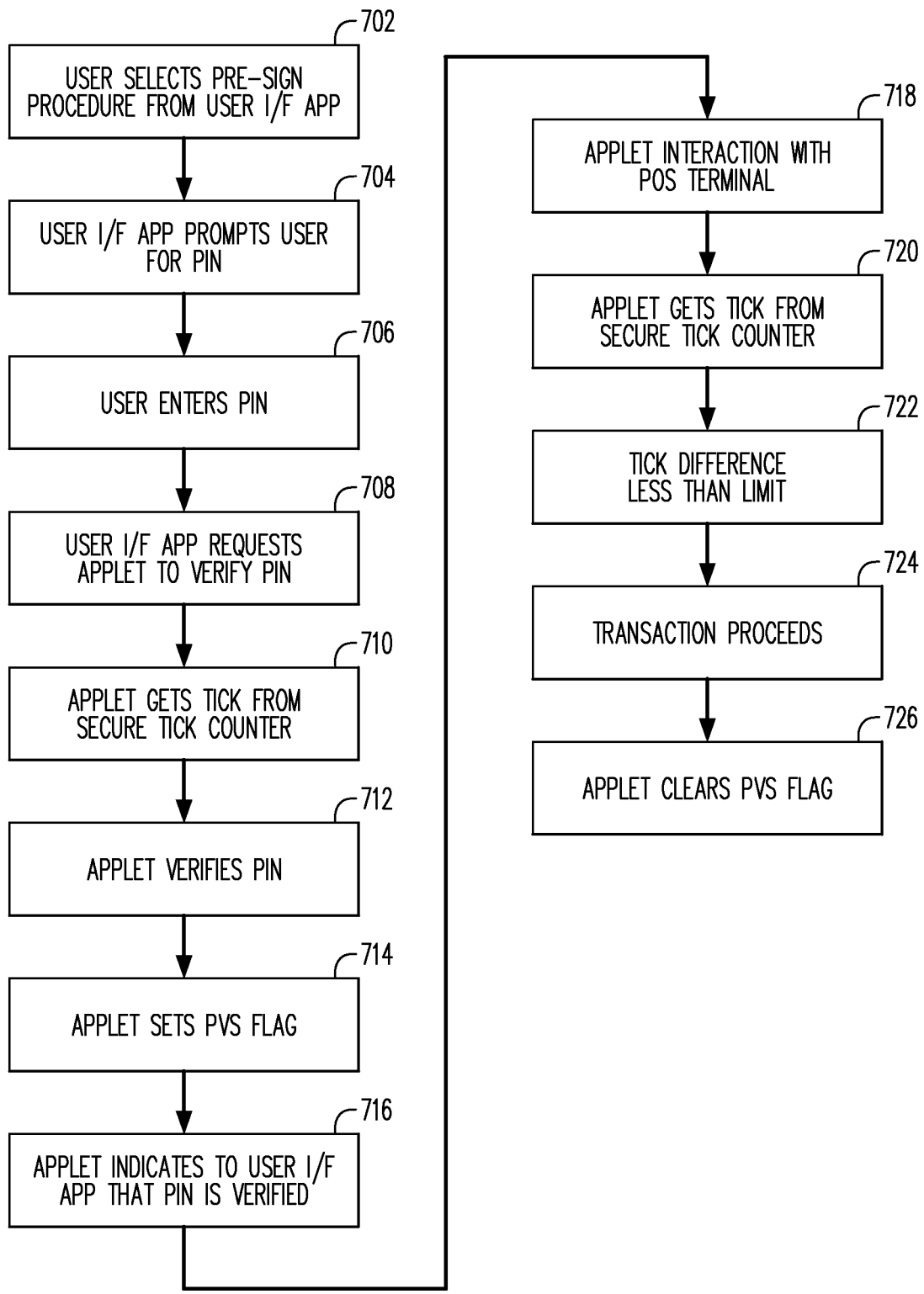
FIGS. 7 and 8 are flow charts that illustrate processes that may be performed in accordance with aspects of the present invention in the payment-enabled mobile telephone of FIG. 3.

FIG. 7 is a flow chart that illustrates a process that may be performed by the payment-enabled mobile telephone 102 in accordance with aspects of the present invention. The process of FIG. 7 corresponds to what could be called a "normal transaction" scenario, i.e., a sequence of events that occur when the payment-enabled mobile telephone 102 is operated successfully to consummate a transaction at a POS terminal. For purposes of this and other scenarios described below, it will be assumed that the environment program 602, the user interface application program 604 and the payment application program 402 are all currently open and operating on the payment-enabled mobile telephone 102 at the commencement of the scenario. It will be appreciated from previous discussion that the payment application program 402 is running on the secure element 324 in these scenarios. Further, these scenarios are premised on operation of the secure tick counter 404. In some embodiments, the secure tick counter 404 operates when the mobile telephone 102 is powered up, but not otherwise.

At 702 in FIG. 7, the user selects an option from a menu or the like by which the user indicates that he/she wishes to "pre-sign" for a transaction. That is, the user wishes to enter his/her PIN to allow the transaction to go forward, and wishes to do so before interfacing the payment-enabled mobile telephone 102 to the proximity reader of the POS terminal. For present purposes it will be assumed that the operation of the payment application program 402 is such that the user must enter his/her PIN for each transaction or at least for transactions for which the amount to be paid is above a certain threshold level (i.e., "high value" transactions). Further (and as will be seen), it is assumed that the desired payment capability of the payment application program 402 is enabled for a predetermined period of time (say 5 minutes) after the user enters his/her PIN. Thus, the payment application program 402 enters an "enabled" state upon entry and verification of the user's PIN and remains in that state for the predetermined period of time, before being switched back (directly or implicitly) to a disabled state. The enabled vs. disabled state of the payment application program 402 may correspond to the state (set vs. cleared, respectively) of a flag referred to as a PVS (PIN verification status) flag and/or may be enforced by reference to the secure tick counter as described herein.

Selection of the pre-sign procedure may be in accordance with conventional operation of the user interface application program 604.

Next, at 704, the user interface application program 604 prompts the user to enter his/her PIN into the payment-enabled mobile telephone 102. This, too, may occur in accordance with conventional operation of the user interface application program 604.

Then, at 706, the user enters his/her PIN into the payment-enabled mobile telephone 102. This may occur in accordance with conventional operation of the user interface application program 604, and may be accomplished by the user's operation of the above-mentioned keypad 310 (FIG. 3).

Continuing to refer to FIG. 7, at 708 the user interface application program 604 requests the payment application program 402 to verify the user's PIN as entered at step 706. This may be done in accordance with conventional operation of the user interface application program 604.

At 710, the payment application program 402 obtains a current tick value from the secure tick counter 404. The current tick value may correspond to the current value of the counter element 504 (FIG. 5). The payment application program 402 may store the tick value for future use as described below.

Referring again to FIG. 7, at 712 the payment application program 402 verifies the user's PIN. This may occur in accordance with conventional operation of the payment application program 402. For example, and as will be familiar to those who are skilled in the art, the user's PIN may have previously been stored in a secure manner (e.g., in the secure element 324) in the payment-enabled mobile telephone 102, and accessible to the payment application program 402. The payment application program 402 may retrieve the stored PIN and compare it to the PIN as entered by the user and passed to the payment application program 402 from the user interface application program 604. If the entered PIN matches the stored and retrieved PIN, then the payment application program 402 deems the entered PIN to have been verified.

At 714, in response to verifying the user's PIN, the payment application program 402 sets the above-mentioned PVS flag, thereby placing itself in the transaction-enabled state. This also may occur in accordance with conventional operation of the payment application program 402.

At 716, the payment application program 402 indicates to the user interface application program 604 that the payment application program 402 has verified the user's PIN. This also may occur in accordance with conventional operation of the payment application program 402. It is assumed for purposes of step 716 that the user interface application program 604 provides a suitable indication to the user to indicate that PIN verification has occurred.

At 718, and in a conventional manner, the payment-enabled mobile telephone 102 is interfaced to the proximity reader of the POS terminal (as in FIGS. 1 and 2), such that the payment application program 402 exchanges communications with the POS terminal. (It should be understood that the process of FIG. 7 may idle, and the secure tick counter may continue to run, between steps 716 and 718 until the interaction between the payment application program 402 and the POS terminal takes place.) As part of step 718, the payment application program 402 checks to see that the PVS flag is set. If not, the transaction is aborted, by a branch of processing not shown in FIG. 7. Even if the PVS flag is set, the payment application program 402 may, in accordance with aspects of the present invention, confirm that the transaction-enabled state is not "stale", by proceeding as described below in connection with step 720.

In connection with the occurrence of step 718, and as indicated at 720, the payment application program 402 again obtains the current tick value from the secure tick counter 404, in the same manner as at step 710. The payment application program 402 then calculates a difference between the tick values as obtained at steps 720 and 710 and then compares that difference with a time-limit value that implements the above-noted time-out period for the transaction-enabled state of the payment application program 402. The balance of FIG. 7 proceeds on the assumption that the time-out period has not expired (i.e., that the difference between the tick values is less than the time-limit value with which the difference is compared).

(In the event that the counter element 504 has overflowed in the period between the steps 710 and 720, the payment application program 402 may take the value of the overflow counter 506 into account in calculating the difference between the tick values obtained at 710 and 720. Also, if the value of the reset counter indicates that the mobile telephone 102 and/or the payment application program 402 and/or the secure tick counter 404 has been reset between steps 710 and 720, then the transaction may simply be aborted.)

Step 722 indicates that the payment application program 402 has found the tick value difference to be less than the applicable limit value, such that the PIN verification status is not stale (i.e., the time-out period has not expired). The transaction is then allowed to proceed (step 724), with the payment application program 402 uploading the payment account number stored in the secure element 324 to the POS terminal in order to consummate the desired purchase transaction.

At 726, in response to successful completion of the purchase transaction, the payment application program 402 clears the PVS flag. This may be done in accordance with conventional operation of the payment application program 402.

Thus in this "normal transaction" scenario illustrated in FIG. 7, compliance with the time-out period for PIN verification is confirmed by reference to tick values obtained by the payment application program 402 from the secure tick counter 404.

Figure 8:
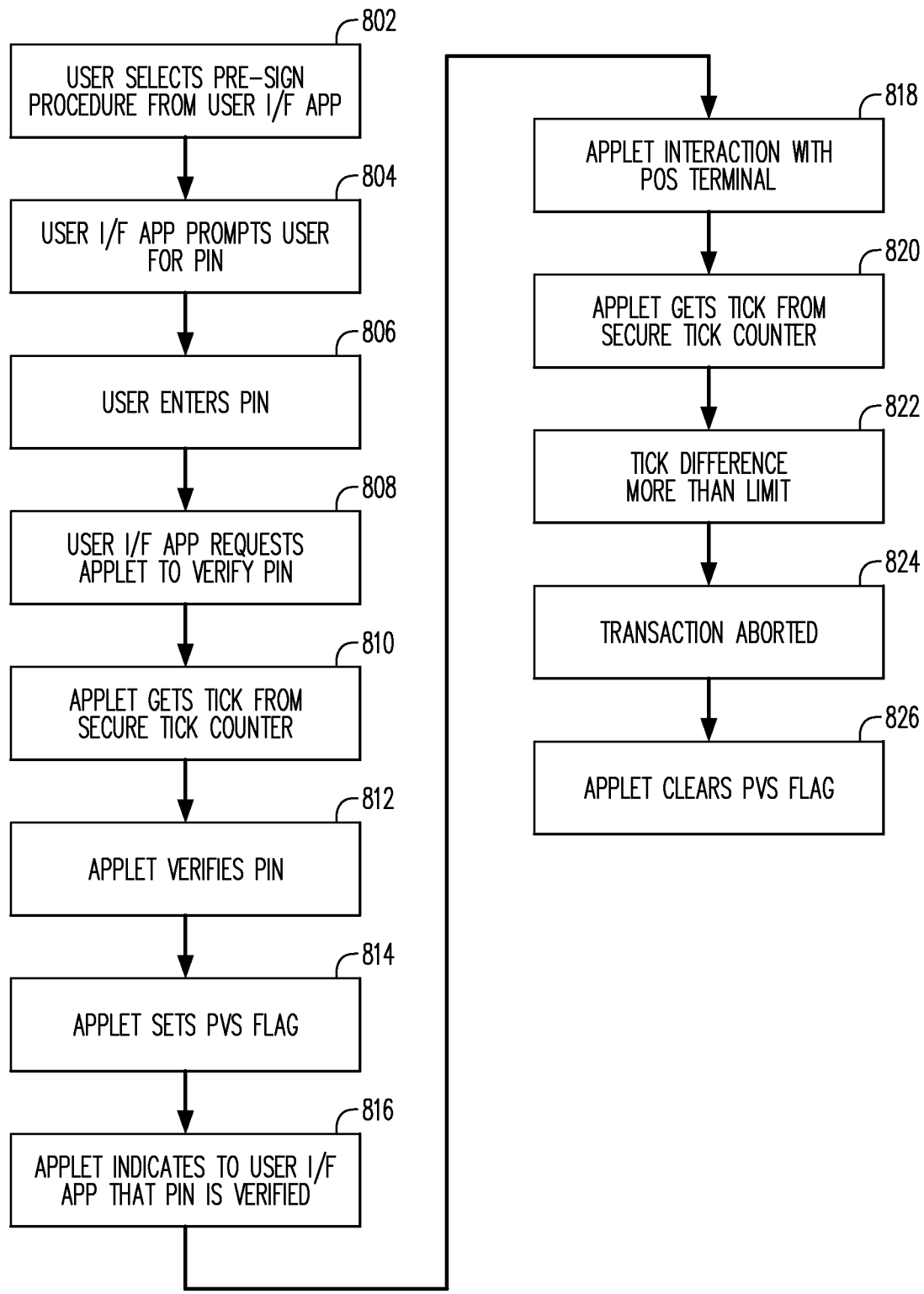

The discussion will now turn to FIG. 8, which in flow chart form illustrates an example transaction process (actually an attempted transaction) in which the PVS flag time-out period expires.

In FIG. 8, steps 802 through 820 are the same as steps 702-720 as described above in connection with FIG. 7, and therefore need not again be fully described. Nevertheless, to provide context for the balance of FIG. 8, those steps will be briefly summarized: The user selects the pre-sign procedure, and enters his/her PIN in response to a prompt from the user interface application program 604. The payment application program 402 verifies the user's PIN in response to a request from the user interface application program 404, obtains a first tick value from the secure tick counter 404 at that time, sets the PVS flag and indicates to the user interface application program 402 that the PIN is verified. Thereafter, the mobile telephone 102 is interfaced to (e.g., tapped on) the reader component of a POS terminal. However, contrary to the assumption underlying FIG. 7, for this example shown in FIG. 8 it is assumed that the interfacing of the mobile telephone to the POS terminal has not occurred until after the time-out period for the PVS flag has expired. Thus in connection with step 820, upon comparing the tick value difference with the time-out limit, the payment application program 402 determines that the tick value difference exceeds the limit, indicating that the time-out period has expired.

This now brings us to 822, which indicates the finding by the payment application program 402 that the tick value difference exceeded the limit. As a consequence, the payment application program 402 aborts the transaction, as indicated at 824. Thus, in the process of FIG. 8, the payment application program 402 does not upload the user's payment card account number to the POS terminal.

Next, at 826, the payment application program 402 clears the PVS flag.

In the scenario presented in FIG. 8, the time-out period for the PVS flag expires and is enforced based on ticks obtained by the payment application program 402 from the secure tick counter 404.

If FIGS. 7 and 8 are considered together, the two flow charts can be considered to represent a logical branching in the payment application program 402 that occurs at step 720/820 depending on whether the tick value difference is less or more than the time limit value with which the difference is compared.

It has been assumed in the foregoing discussion that expiration of the time-out period would result in aborting the transaction. Such need not necessarily be the case. For example, the expiration of the time out period could be a factor to be used as part of a risk management decision, and/or could lead to a requirement that an online authorization for the transaction be obtained from the issuer of the payment card account.

In an alternative embodiment of the invention, the payment application program 402 may more actively enforce the PVS time-out period. In this alternative embodiment, at the time the PVS flag is set, the payment application program 402 obtains a tick value from the secure tick counter 404 and adds to that tick value a suitable limit value to indicate when the time-out period will expire. The payment application program 402 then stores the resulting sum and compares it on an ongoing periodic basis with current tick values obtained from the secure tick counter 404 until the current tick value exceeds the sum. The payment application program 402 then clears the PVS flag, which will cause a subsequent attempt at a transaction to be aborted. Of course, if the transaction is attempted before the time-out period expires, then the payment application program 402 consummates the transaction, clears the PVS flag and stops comparing the sum with current tick values.

In example embodiments described above, the tick counter values are used to enforce a PVS flag time-out period. In addition or alternatively, other time-out periods may be enforced in a similar manner. Such other time-out periods may include, for example an ACK (acknowledgement signal) time-out (employed with respect to a positive response by the user to a challenge from the POS terminal as to whether the transaction should proceed), or a transaction context time-out (employed when a transaction context is to be stored across multiple sessions).

In alternative embodiments, the tick counter may be implemented in a trusted component of the mobile telephone other than the secure element 324.

Although an embodiment described herein includes both an overflow counter and a reset counter, the functions of these counters may alternatively be combined into one counter, that is incremented both on overflow and reset.

In some embodiments, the timing mechanism implemented in the secure element 324 may be different from the secure tick counter as described herein. For example, a secure clock that runs perpetually may alternatively be implemented in the secure element 324.

Enforcement of a PIN verification time-out has been described herein with respect to a purchase transaction. In addition or alternatively, the PIN verification time-out may be enforced as described herein for other purposes, such as top-up transactions, balance inquiry transactions, or online access transactions.

The invention has been described herein in the context of a mobile telephone, but alternatively may be employed in other types of mobile devices, such as PDAs (personal digital assistants—such as the types of devices sold under the registered trademark "BlackBerry") or handheld music players.

The above description and/or the accompanying drawings are not meant to imply a fixed order or sequence of steps for any process referred to herein; rather any process may be performed in any order that is practicable, including but not limited to simultaneous performance of steps indicated as sequential.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A mobile device, comprising:
   a housing;
   an antenna mounted in or on the housing for transmitting and receiving transaction signals to and from a point of sale (POS) terminal;
   at least one user interface element mounted on the housing;
   a transceiver mounted in the housing and coupled to the antenna;
   a secure element including processing circuitry and storage elements secured from tampering and unauthorized access mounted in the housing, the secure element coupled to the transceiver and storing a payment application program, the payment application program operable to conduct a pre-sign procedure to verify a personal identification number (PIN) before exchanging transaction signals with the POS terminal; and
   a secure tick counter mounted in the housing and operated within the secure element, the secure tick counter for enforcing at least one time-out period with respect to transactions such that when the payment application program determines that the at least one time-out period expired then a risk management decision is enforced that depends on a type of the transaction, wherein the secure tick counter comprises:
   an oscillator;
   a counter operably coupled to the oscillator;
   an overflow counter operatively coupled to the counter; and
   a reset counter;
   wherein the reset counter is accessible by the payment application and increments upon detection of a reset event of the mobile device.

2. The mobile device of claim 1, wherein:
   the time-out period is enforced with respect to PIN (personal identification number) verification status.

3. The mobile device of claim 1, wherein:
   the time-out period is enforced with respect to ACK (acknowledgement signal) verification status.

4. The mobile device of claim 1, wherein:
   the time-out period is enforced with respect to maintaining a transaction context.

5. The mobile device of claim 1, wherein the time-out period is enforced by:
   (a) receiving a first tick value from the tick counter at a time of PIN (personal identification number) verification;
   (b) receiving a second tick value from the tick counter at a time of interaction between the payment application program and the POS terminal; and
   (c) comparing a difference between the first and second tick values with a time-out limit value.

6. The mobile device of claim 1, wherein the time-out period is enforced by:
   (a) receiving a first tick value from the tick counter at a time of PIN (personal identification number) verification;
   (b) setting a tick limit value based on the first tick value and a time-out limit value; and
   (c) tracking a current tick value provided by the tick counter against the tick limit value.

7. The mobile device of claim 1, wherein the payment application program is a payment applet.

8. A method comprising:
   providing a mobile device which includes a secure element comprising processing circuitry and storage elements secured from tampering and unauthorized access;
   operating a payment application program in said secure element, the payment application program conducting a pre-sign procedure to verify a personal identification number (PIN) before interfacing the mobile device to exchange transaction signals with a point-of-sale (POS) terminal;
   operating a secure tick counter in said secure element, the secure tick counter comprising a tick counter, an oscillator, an overflow counter and a reset counter, wherein the tick counter generates a first tick value when the PIN is verified for a transaction, and wherein the tick counter enforces at least one time-out period with respect to transactions handled by the payment application program and the reset counter increments upon detection of a reset event of the mobile device;
   determining, by the payment application program, that the at least one time-out period expired; and
   determining, based on the expiration and on a type of the transaction, a risk management decision to enforce with regard to the transaction.

9. The method of claim 8, wherein the time-out period is enforced by:
   (a) receiving a first tick value from the tick counter at a time of PIN (personal identification number) verification;
   (b) receiving a second tick value from the tick counter at a time of interaction between the payment application program and the POS terminal; and
   (c) comparing a difference between the first and second tick values with a time-out limit value.

10. The method of claim 8, wherein the time-out period is enforced by:
   (a) receiving a first tick value from the tick counter at a time of PIN (personal identification number) verification;
   (b) setting a tick limit value based on the first tick value and a time-out limit value; and
   (c) tracking a current tick value provided by the tick counter against the tick limit value.

11. The method of claim 8, wherein the risk management decision comprises aborting the transaction.

12. The method of claim 8, wherein the risk management decision comprises requiring an online authorization.

13. The method of claim 9, wherein the interaction between the payment application program and the POS terminal comprises transmitting a payment card account number to the POS terminal.

* * * * *